(12) United States Patent
Kelley et al.

(10) Patent No.: US 12,501,580 B2
(45) Date of Patent: Dec. 16, 2025

(54) SYSTEMS AND METHODS FOR TWO-PHASE COOLING OF ELECTRONIC COMPONENTS

(71) Applicant: Microsoft Technology Licensing, LLC, Redmond, WA (US)

(72) Inventors: Douglas Patrick Kelley, Sammamish, WA (US); Alexis Grace Schubert, Seattle, WA (US); Kathryn M. Oseen-Senda, Seattle, WA (US); Martha Geoghegan Peterson, Woodinville, WA (US); Dennis Trieu, Calgary (CA)

(73) Assignee: Microsoft Tehcnology Licensing, LLC, Redmond, WA (US)

( * ) Notice: Subject to any disclaimer, the term of this patent is extended or adjusted under 35 U.S.C. 154(b) by 342 days.

(21) Appl. No.: 17/706,024

(22) Filed: Apr. 14, 2022

(65) Prior Publication Data

US 2023/0189478 A1 Jun. 15, 2023

Related U.S. Application Data

(60) Provisional application No. 63/289,093, filed on Dec. 13, 2021.

(51) Int. Cl.
*H05K 7/20* (2006.01)
*G06F 1/20* (2006.01)

(52) U.S. Cl.
CPC ......... *H05K 7/20327* (2013.01); *H05K 7/203* (2013.01); *H05K 7/20409* (2013.01); *G06F 1/20* (2013.01)

(58) Field of Classification Search
CPC ..... H05K 7/203; H05K 7/20309; H01L 23/44
See application file for complete search history.

(56) References Cited

U.S. PATENT DOCUMENTS

| | | | | |
|---|---|---|---|---|
| 4,644,745 | A * | 2/1987 | Wagner | F02K 9/62 60/741 |
| 8,059,405 | B2 * | 11/2011 | Campbell | F28F 3/02 361/679.53 |
| 9,250,024 | B2 * | 2/2016 | Campbell | F28F 3/048 |
| 10,020,242 | B2 * | 7/2018 | Katsumata | H01L 23/44 |
| 10,681,846 | B2 * | 6/2020 | Iyengar | G06F 1/20 |
| 2009/0260777 | A1 | 10/2009 | Attlesey | |
| 2009/0294106 | A1 * | 12/2009 | Flotta | H01L 23/4735 165/104.33 |

(Continued)

FOREIGN PATENT DOCUMENTS

DE 102017215759 A1 3/2019

OTHER PUBLICATIONS

"International Search Report and Written Opinion Issued in PCT Application No. PCT/US22/047959", Mailed Date: Jan. 24, 2023, 10 Pages.

*Primary Examiner* — Lionel Nouketcha
(74) *Attorney, Agent, or Firm* — Ray Quinney & Nebeker P.C.; Paul N. Taylor (57) ABSTRACT

A heat sink includes a body with an expansion chamber therein. The body is configured to receive heat from a heat source. The expansion chamber is configured to expand a working fluid from an inlet port to an outlet port of the heat sink. An immersion system includes a heat sink and a pressurizing mechanism for pressurizing the working fluid prior to the inlet port.

17 Claims, 5 Drawing Sheets

(56) References Cited

U.S. PATENT DOCUMENTS

| | | | |
|---|---|---|---|
| 2011/0037390 A1* | 2/2011 | Ko | F21V 29/59 |
| | | | 315/117 |
| 2012/0097368 A1 | 4/2012 | Chen et al. | |
| 2014/0090818 A1 | 4/2014 | Rosenfeld et al. | |
| 2014/0262186 A1 | 9/2014 | Kandlikar | |
| 2017/0105313 A1* | 4/2017 | Shedd | H05K 7/20309 |
| 2017/0179001 A1* | 6/2017 | Brunschwiler | H01L 23/427 |
| 2020/0211925 A1* | 7/2020 | Sato | G03B 21/16 |

* cited by examiner

SYSTEMS AND METHODS FOR TWO-PHASE COOLING OF ELECTRONIC COMPONENTS

CROSS-REFERENCE TO RELATED APPLICATIONS

This application claims priority to and the benefit of U.S. Provisional Patent Application No. 63/289,093, filed on Dec. 13, 2021, which is hereby incorporated by reference in its entirety.

BACKGROUND

Background and Relevant Art

Computing devices generate heat as a byproduct of computational workloads. The heat is removed from the system to allow processing to continue without incurring damage to the electronic components. A heat sink receives heat from the electronic component(s) to efficiently remove heat from the computing device to a surrounding environment.

BRIEF SUMMARY

In some embodiments, a heat sink includes a body with an expansion chamber therein. The body is configured to receive heat from a heat source. The expansion chamber is configured to expand a working fluid from an inlet port to an outlet port of the heat sink.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a perspective view of another heat sink, according to at least some embodiments of the present disclosure;

FIG. 2-2 is a side cross-sectional view of the heat sink of FIG. 2-1;

FIG. 4-1 is a perspective view of a heat sink with heat transfer features, according to at least some embodiments of the present disclosure;

FIG. 4-2 is a perspective cross-sectional view of the heat sink of FIG. 4-1;

FIG. 5-1 is a perspective view of a heat sink with a plurality of expansion chambers, according to at least some embodiments of the present disclosure;

FIG. 5-2 is a perspective translucent view of the heat sink of FIG. 5-1, according to at least some embodiments of the present disclosure;

DETAILED DESCRIPTION

The present disclosure relates generally to systems and methods for thermal management of electronic devices. More particularly, some embodiments of the present disclosure relate to heat sinks that reject heat from a heat source to a working fluid. In some embodiments, a heat sink according to the present disclosure includes an expansion chamber to adiabatically expand a working fluid. The expansion and/or vaporization of the working fluid transfers heat from the heat sink body to the working fluid, which flows through and out of the heat sink body.

Figure 1:
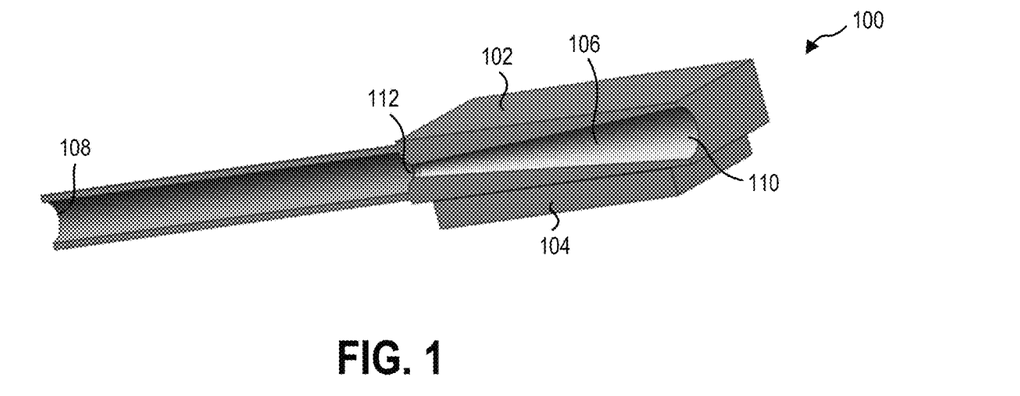
FIG. 1 is a perspective cross-sectional view of a heat sink, according to at least some embodiments of the present disclosure.

FIG. 1 is a cross-sectional perspective view of a heat sink 100 according to some embodiments of the present disclosure. A body 102 of the heat sink 100 receives heat from a heat source 104. In some embodiments, the heat source 104 is an electronic component, such as a processor, system memory, hardware storage device, network communication device, power supply, or other electronic component that generates heat during operation.

In some embodiments, the heat sink 100 is coupled directly to the heat source 104. In some embodiments, the heat sink 100 is thermally connected to the heat source 104 by a thermal interface material (TIM), such as a thermal paste, which provides a continuous contact surface to conduct heat from the heat source 104 to the heat sink 100. In some embodiments, the heat sink 100 is thermally connected to the heat source 104 by a heat pipe, vapor chamber, or other thermal conduit that transfers heat from the heat source 104 to the heat sink 100 via conduction or convection of a working fluid therethrough.

The heat sink 100, in some embodiments, has a body 102 that defines an expansion chamber 106. The heat sink 100 receives a working fluid at an inlet port 108 and exhausts the working fluid at an outlet port 110. In some embodiments, the expansion chamber 106 flares from an orifice 112 toward the outlet port 110. The increasing transverse area of the expansion chamber 106 in the direction of working fluid flow (e.g., from the inlet port 108 to the outlet port 110) contributes to expansion of a vapor phase of the working fluid to cool the heat sink 100.

Figure 21:
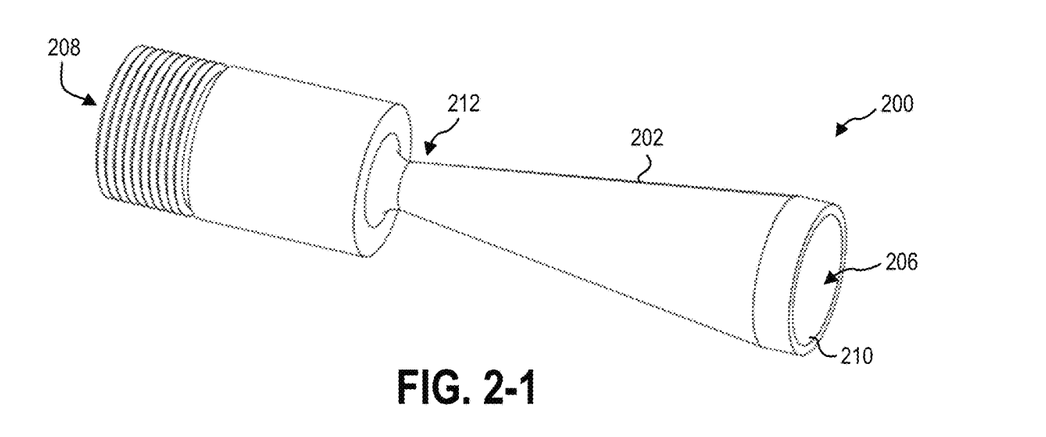
Figure 22:
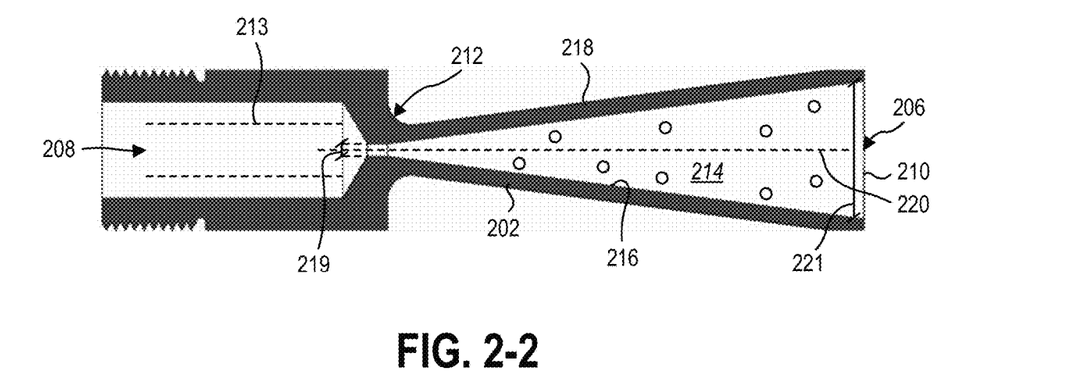

FIGS. 2-1 and FIGS. 2-2 illustrate another embodiment of a heat sink 200. In some embodiments, a heat sink 200 has a body 202 that is additively manufactured, cast, forged, milled, machines, welded, brazed, or combinations thereof to define the expansion chamber 206 therein. In some embodiments, the body 202 is additively manufactured in a single contiguous piece of material. In other embodiments, the body 202 is formed in two or more separate pieces, which are later fixed together to form the body 202. The body 202 may include the inlet port 208, the outlet port 210, the orifice 212 along with the expansion chamber 206.

In some embodiments, the inlet port 208 includes a mechanical connection mechanism, such as threads, to connect the heat sink 200 to a working fluid conduit. In some embodiments, the mechanical connection mechanism includes a twist lock, a press fit, a snap fit, a Swagelok style compression fitting, or other fluid conduit connection mechanisms.

As illustrated in FIG. 2-2, the expansion chamber 206 includes an orifice 212 that provides fluid communication from the inlet port 208 into the expansion chamber 206. The orifice 212 restricts fluid flow therethrough to increase pressure proximate the inlet port 208. The relatively high pressure at the inlet port 208 and lower pressure in the expansion chamber 206 (opposite the orifice 212) accelerates the working fluid 213 through the orifice 212. In some embodiments, heat in the body 202 in combination with the expansion of the working fluid 213 entering and moving through the expansion chamber 206 vaporizes the working fluid 213. In some embodiments, the orifice 212 may be changeable by a threaded connection, a press fit, a friction fit, a snap ring, one or more mechanical fasteners, etc.

After passing through the orifice 212, the working fluid 213 expands into a passage 214 through the expansion chamber 206. In some embodiments, the passage 214 increases in a transverse dimension (e.g., diameter) in the flow direction. An inner surface 216 of the expansion chamber 206 may define at least a portion of the expanding passage 214. The passage 214 between the orifice 212 and outlet port 210 flares in at least one of the vertical transverse direction, horizontal transverse direction, or both.

In some embodiments, at least a portion of the passage 214 flares linearly such that the inner surface is linear in longitudinal cross-section (such as illustrated in FIG. 2-2). In some embodiments, at least a portion of the passage 214 flares non-linearly such that the inner surface is curved in longitudinal cross-section. In some embodiments, the passage 214 flares uniformly, such as having a linear flare that is constant relative to a longitudinal axis 220 of the expansion chamber 206. In some embodiments, at least a portion of the passage 214 of the expansion chamber 206 is axially symmetrical around the longitudinal axis 220 (e.g., is at least partially cylindrical and/or conical).

The inner surface 216 of the passage 214 and/or expansion chamber 206, in some embodiments, includes surface features to promote vaporization and/or heat transfer from the body 202 to the working fluid 213. For example, the inner surface 216 may include nucleation sites to lower the input energy needed to vaporize the working fluid 213.

In some embodiments, the orifice 212 is shaped and/or textured to further promote vaporization and/or expansion of the working fluid 213 in the expansion chamber 206. For example, the orifice 212 may be shaped to cause the working fluid 213 to diverge as the working fluid 213 passes through the orifice 212 into the expansion chamber 206. In some examples, the orifice 212 may be shaped to direct the working fluid 213 toward an inner surface 216 of the passage 214 and/or expansion chamber 206 as the working fluid 213 passes through the orifice 212 into the expansion chamber 206. In some examples, the orifice 212 may be shaped to prevent backflow of the working fluid 213 within the passage 214 and/or expansion chamber 206.

In some embodiments, the orifice 212 has an orifice diameter 219 and the outlet port 210 has an outlet diameter 221. It should be understood that the orifice 212 and outlet port 210 illustrated in FIGS. 2-1 and FIGS. 2-2 are circular (and therefore have diameters), in other embodiments, the orifice 212 and/or outlet port 210 have non-circular shapes and the orifice diameter 219 and/or outlet diameter 221 are an orifice transverse dimension and/or an outlet transverse dimension, respectively.

The orifice diameter 219 and the outlet diameter 221 form an expansion diameter ratio. For example, the expansion diameter ratio may be in a range having an upper value, a lower value, or upper and lower values including any of 0.05 (such as a 0.5 mm orifice diameter 219 to a 10 mm outlet diameter 221), 0.1, 0.2, 0.3, 0.4, 0.5, 0.6, 0.7, 0.8, or any values therebetween. In some examples, the expansion diameter ratio is at least 0.05. In some examples, the expansion diameter ratio is less than 0.8. In some examples, the expansion diameter ratio is between 0.05 and 0.8. In some examples, the expansion diameter ratio is between 0.1 and 0.5.

The orifice 212 has an orifice area and the outlet port 210 has an outlet area. The orifice area and the outlet area form an expansion area ratio. For example, the expansion area ratio may be in a range having an upper value, a lower value, or upper and lower values including any of 0.01 (such as a 0.1 mm$^2$ orifice area to a 10 mm$^2$ outlet area), 0.05, 0.1, 0.2, 0.3, 0.4, 0.5, 0.6, 0.7, 0.8, or any values therebetween. In some examples, the expansion area ratio is at least 0.01. In some examples, the expansion area ratio is less than 0.8. In some examples, the expansion area ratio is between 0.01 and 0.8. In some examples, the expansion diameter ratio is between 0.05 and 0.25.

In some embodiments, the working fluid 213 enters the inlet port 208 of the heat sink 200 within 5° C. of a boiling point of the working fluid at atmospheric pressure. For example, a working fluid 213 with a boiling point of 50° C. enters the inlet port 208 of the heat sink 200 at no less than 45° C. In some embodiments, the working fluid 213 enters the inlet port 208 of the heat sink 200 at the boiling point of the working fluid at atmospheric pressure. In some embodiments, the working fluid 213 enters the inlet port 208 of the heat sink 200 at a temperature of 50° C.

Figure 3:
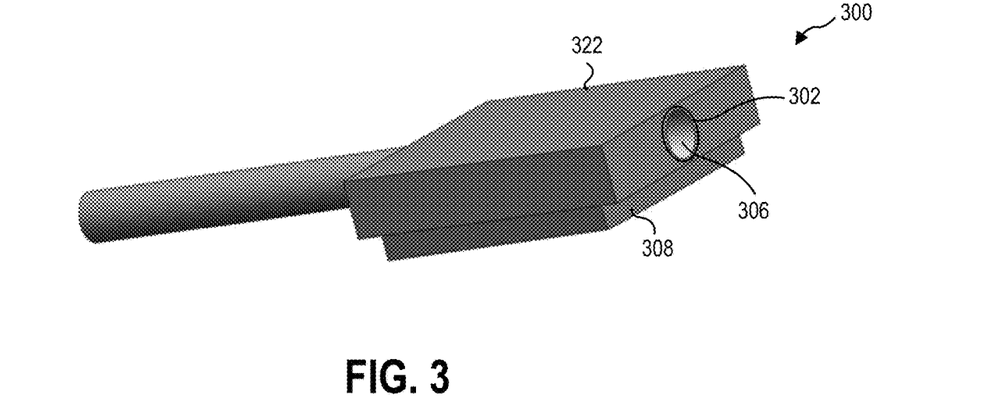
FIG. 3 is a perspective view of yet another heat sink, according to at least some embodiments of the present disclosure.

FIG. 3 is a perspective view of a heat sink 300 with a body 302 located in a thermal slug 322. The body 302 may be manufactured according to the methods and/or geometries described in relation to FIGS. 2-1 and FIGS. 2-2, while the thermal slug 322 transfers heat from the heat source 308 to the heat sink 300. In some embodiments, the thermal slug 322 is coupled to the body 302 of the heat sink 300 after the heat sink 300 is manufactured. In some embodiments, at least a portion of the expansion chamber 306 and/or passage is machined into the thermal slug 322.

Figure 41:
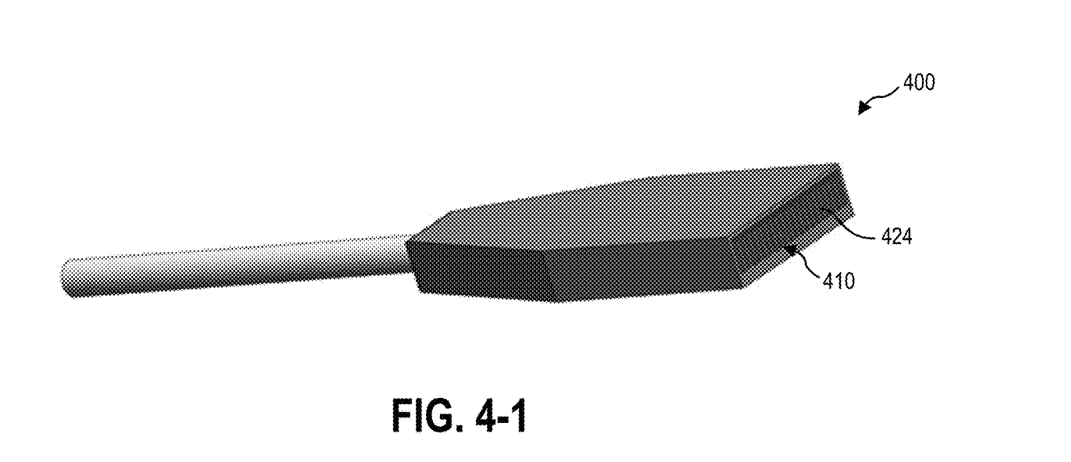
Figure 42:
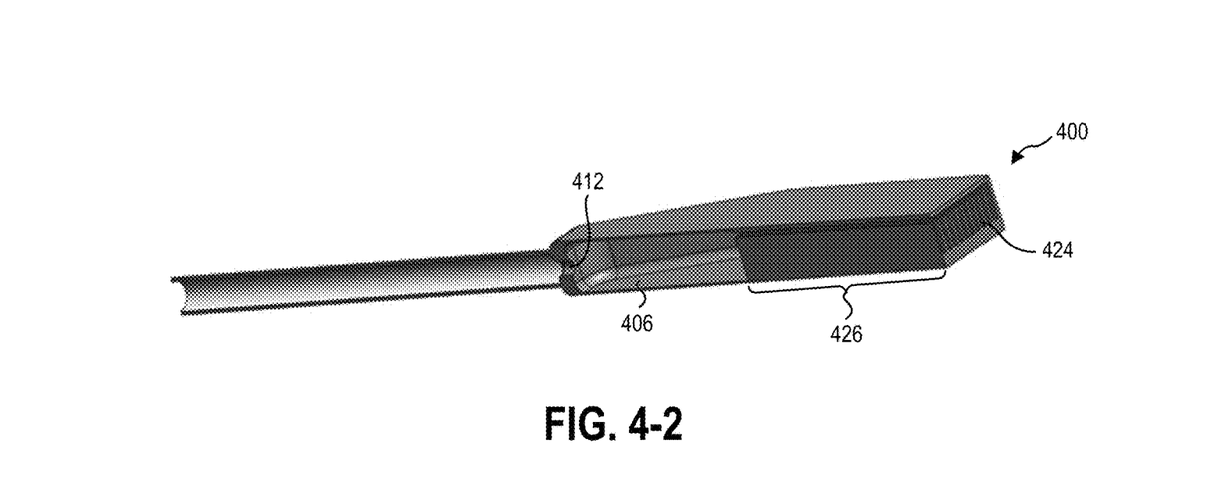

In some embodiments, a heat sink 400 includes at least one heat transfer feature positioned in the expansion chamber 406, as illustrated in FIGS. 4-1 and FIGS. 4-2. For example, a plurality of fins 424 are positioned proximate the outlet port 410 of the heat sink 400. The fins 424 are coupled to and/or integrally formed with the body 402 of the heat sink 400 to transfer heat to a working fluid passing through the expansion chamber 406 and out of the outlet port 410. The working fluid passes through the orifice 412 into the expansion chamber 406 and, after expanding into a gas, the gas will decrease in temperature before receiving heat from the fins 424 in the heat transfer feature portion 426 of the heat sink 400 before exiting through the outlet port 410. In other embodiments, the thermal transfer features include pins, mesh, posts, surface textures, or combinations thereof.

In some embodiments, the heat transfer features are in a portion of the expansion chamber 406. In some embodiments, the heat transfer features are in a full longitudinal length of the expansion chamber 406. In some embodiments, the heat transfer features are in at least 10% of a longitudinal length of the expansion chamber 406. In some embodiments, the heat transfer features are in at least 25% of a longitudinal length of the expansion chamber 406. In some embodiments, the heat transfer features are in at least 50% of a longitudinal length of the expansion chamber 406.

In some embodiments, at least a portion of the expansion chamber 406 flares in a first transverse direction, while flaring by a different amount and/or staying uniform in the second transverse direction. For example, FIG. 4-2 illustrates an embodiment of a heat sink 400 where the expansion chamber 406 flares in horizontal direction while remaining a uniform height along a longitudinal length of the expansion chamber 406. In some embodiments, the expansion chamber 406 has uniform transverse dimensions in a heat transfer feature portion 426.

Figure 51:
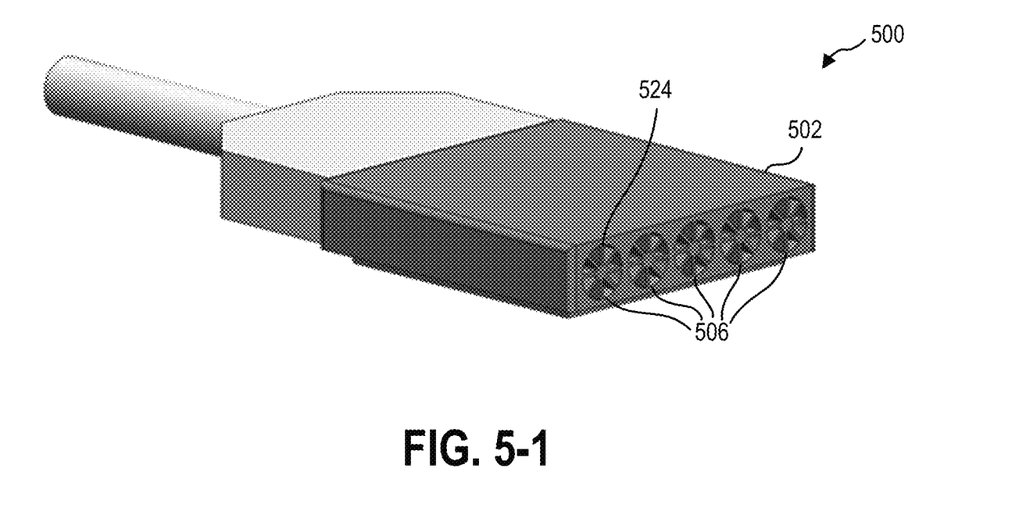
Figure 52:
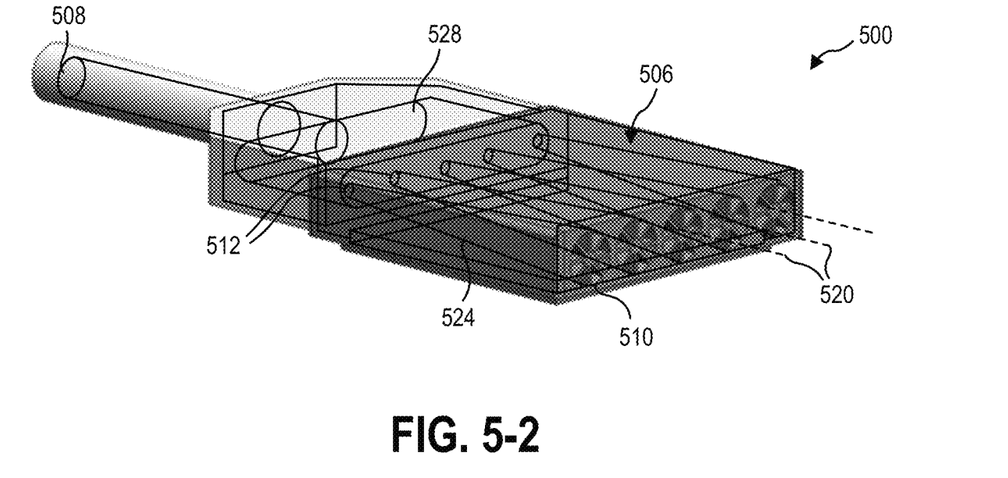

Some embodiments of heat sinks 500 include a plurality of expansion chambers 506 in a single body 502, such as the embodiment illustrated in FIGS. 5-1 and FIGS. 5-2. In other embodiments, the heat sink has a plurality of bodies. In some embodiments, the heat transfer features 524 are located radially around a longitudinal axis 520 of the expansion chamber 506.

FIG. 5-2 is a partially translucent illustration of the heat sink 500 with an array of expansion chambers 506. In some embodiments, the expansion chambers 506 receive working fluid from the inlet port 508 through a manifold 528 that distributes working fluid to orifices of the expansion chambers. In some embodiments, the expansion chambers 506 have the same geometry (e.g., same flare, same area, same volume). In some embodiments, the expansion chambers 506 have different geometries. In some embodiments, the expansion chambers 506 have different geometries that are based at least partially on differences in fluid pressure in the manifold at each of the orifices 512.

In some embodiments, the longitudinal axes 520 of the expansion chambers 506 are parallel to one another. In other embodiments, at least one of the longitudinal axes 520 of the expansion chambers 506 is not parallel to at least one other longitudinal axis.

In the embodiment illustrated in FIGS. 5-1 and FIGS. 5-2, the array of expansion chambers 506 are positioned in 1×5 arrangement. In other embodiments, an array of expansion chambers 506 are positioned in a 1×2, 1×3, 1×4, 1×10, 2×2, 2×4, 2×7, 3×5, or any other arrangement of expansion chambers 506.

Figure 6:
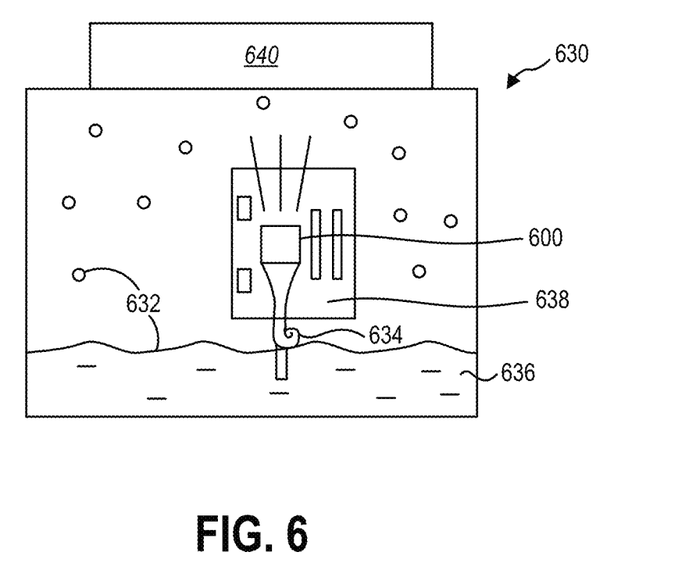
FIG. 6 is a schematic representation of an immersion cooling system with an expansion cooling heat sink, according to at least some embodiments of the present disclosure.

FIG. 6 is a schematic illustration of an immersion tank 630 with immersion tank working fluid 632 therein. A pressurizing mechanism provides immersion tank working fluid 632 to an inlet port of a heat sink 600 at an increased fluid pressure relative to the outlet port of the heat sink 600 such that the working fluid in the heat sink 600 is the same fluid as that in the immersion tank (i.e., the immersion tank working fluid 632. For example, the pressurizing mechanism receives the immersion tank working fluid 632 at an inlet of the pressurizing mechanism and urges the immersion tank working fluid 632 out of an outlet of the pressurizing mechanism at an increased fluid pressure. In some embodiments, the pressurizing mechanism is a fluid pump 634. In some embodiments, the pressurizing mechanism is a vacuum pump that lowers the fluid pressure proximate the outlet port.

In some embodiments, the working fluid enters the pressurizing mechanism within 10° C. of a boiling point of the working fluid at atmospheric pressure. For example, a working fluid with a boiling point of 50° C. enters the pressurizing mechanism at no less than 40° C.

In some embodiments, a fluid pump 634 pumps the immersion tank working fluid 632 from a fluid reservoir 636 of the liquid phase of the immersion tank working fluid 632 in the immersion tank 630 to a heat sink 600, such as any embodiment of a heat sink 600 described herein, that is thermally connected to a heat source of a computing device 638.

In some embodiments, the fluid pump 634 is a diaphragm fluid pump. In some embodiments, the fluid pump 634 is a duplex pump. In some embodiments, the fluid pump 634 is a pneumatic pump. In some embodiments, the fluid pump 634 is a triplex pump. In some embodiments, the fluid pump 634 is a gear pump. In some embodiments, the fluid pump 634 is any fixed displacement pump. In some embodiments, the fluid pump 634 pressurizes the working fluid proximate an orifice in the heat sink 600 to at least 20 pounds per square inch (psi). In some embodiments, the fluid pump 634 pressurizes the working fluid proximate an orifice in the heat sink 600 to at least 70 psi. In some embodiments, the fluid pump 634 pressurizes the working fluid proximate an orifice in the heat sink 600 to at least 90 psi. In some embodiments, the fluid pump 634 pressurizes the working fluid proximate an orifice in the heat sink 600 to at least 100 psi. In some embodiments, the fluid pump 634 pressurizes the working fluid proximate an orifice in the heat sink 600 to at least 200 psi. In some embodiments, the fluid pump 634 pressurizes the working fluid proximate an orifice in the heat sink 600 to at least 300 psi. In some embodiments, the working fluid leaves the outlet port of the heat sink at a pressure at least 5 psi lower than the pressure at which the working fluid entered the inlet of the expansion chamber.

The movement of the immersion tank working fluid 632 through the heat sink 600 vaporizes immersion tank working fluid 632 into a vapor phase of the immersion tank working fluid 632 that is exhausted into the immersion tank 630. The vapor phase of the immersion tank working fluid 632 may be condensed by a condenser 640 back into the liquid phase of the immersion tank working fluid 632, which returns to the fluid reservoir 636.

In some embodiments, the pump 634 is located inside the immersion tank 630. In some embodiments, the pump 634 is located externally to the immersion tank 630. For example, an external pump 634 may provide easy access for pump replacement or service. In some embodiments, a pump 634 is connected to a plurality of heat sinks 600 via a distribution manifold inside the tank.

Figure 7:
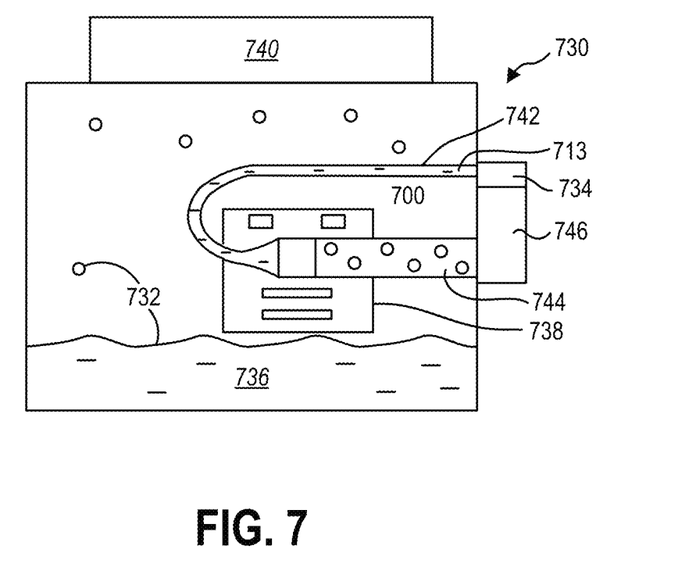
FIG. 7 is a schematic representation of an immersion cooling system with a closed-loop heat sink, according to at least some embodiments of the present disclosure.

In some embodiments, a heat sink according to the present disclosure is part of a closed-loop thermal management system that does not share the working fluid with other systems. FIG. 7 is a schematic representation of an embodiment of an immersion tank 730 with a computing device 738 positioned in the immersion tank 730. A heat sink 700 is thermally connected to a heat source of the computing device 738. A working fluid supply conduit 742 provides a liquid phase of the working fluid 713 to the heat sink 700 (such as any embodiment of a heat sink described herein). In contrast to the embodiments described in relation to FIG. 6, the working fluid 713 circulated through the heat sink 700 is not shared with the immersion tank 730 (i.e., is a different fluid than the immersion working fluid 732). In other words, the working fluid 713 in the heat sink 700 is separated from the immersion tank working fluid 732 in the fluid reservoir 736.

The heat sink 700 vaporizes the liquid phase of the working fluid 713 provided by the working fluid supply conduit 742 in a vapor phase of the working fluid 713. The vapor phase is conveyed by a working fluid return conduit 744 to a heat exchanger 746 that condenses the working fluid 713 from the heat sink 700. In some embodiments, the condenser 740 of the immersion tank 730 and the heat exchanger 746 are separate and independent of one another. In some embodiments, the condenser 740 of the immersion tank 730 and the heat exchanger 746 are the same but have separate conduits to keep the working fluid 713 from the heat sink 700 separate from the immersion tank working fluid 732.

In some embodiments, the heat exchanger 746 cools the vapor working fluid 713 without condensing the working fluid 713 into a liquid phase. The working fluid supply line 742 may provide a vapor phase to the heat sink 700. In some embodiments, a heat sink 700 according to the present disclosure receives a pressurized vapor phase that subsequently expands while passing through the orifice and/or expansion chamber, as described herein. In some embodiments, adiabatic expansion of the vapor working fluid cools the working fluid to receive heat from the heat sink 700 and cool the heat sink 700.

In some embodiments, the heat exchanger 746 includes a fluid pump 734 to pressurize the working fluid 713 in the working fluid supply conduit 742. In some embodiments, the fluid pump 734 is a diaphragm fluid pump. In some embodiments, the fluid pump 734 is a duplex pump. In some embodiments, the fluid pump 734 is a pneumatic pump. In some embodiments, the fluid pump 734 pressurizes the working fluid proximate an orifice in the heat sink 700 to at least 70 pounds per square inch. In some embodiments, the fluid pump 734 pressurizes the working fluid proximate an orifice in the heat sink 700 to at least 90 pounds per square inch. In some embodiments, it may be critical that the fluid pump 734 pressurizes the working fluid proximate an orifice in the heat sink 700 to at least 100 pounds per square inch.

Figure 8:
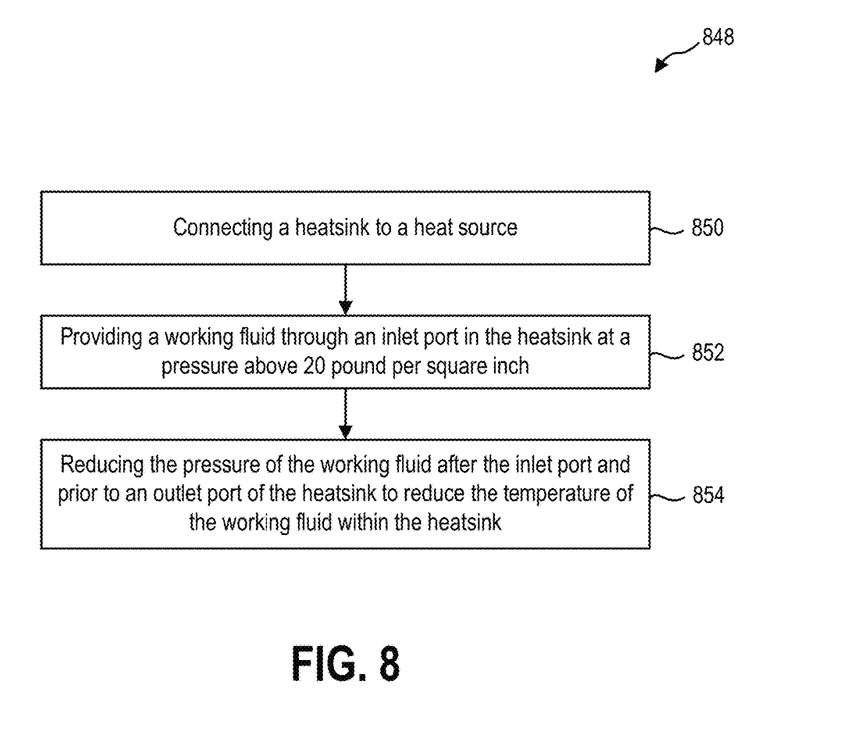
FIG. 8 is a flowchart illustrating a method of thermal management, according to at least some embodiments of the present disclosure.

FIG. 8 is a flowchart illustrating a method 848 of thermal management. The method includes connecting a heat sink, such as any heat sink described herein, to one or more heat sources at 850. The heat source may be any component(s) of an electronic device that generates heat during operation. In some embodiments, the method 848 includes providing a working fluid through an inlet port in the heat sink at a pressure above 20 psi at 852, and then reducing the pressure of the working fluid after the inlet port and prior to an outlet port of the heat sink to reduce the temperature of the working fluid within the heat sink at 854.

In some embodiments, the heat source operates at a maximum temperature of at least 50° C. In some embodiments, reducing the temperature of the working fluid includes changing a physical phase of the working fluid after passing through the inlet port and before passing through the outlet port. In some embodiments, reducing the temperature of the working fluid includes atomizing the working fluid after passing through the inlet port and before passing through the outlet port. In some embodiments, atomizing the working fluid includes passing the working fluid through an orifice in the heat sink.

Figure 9:
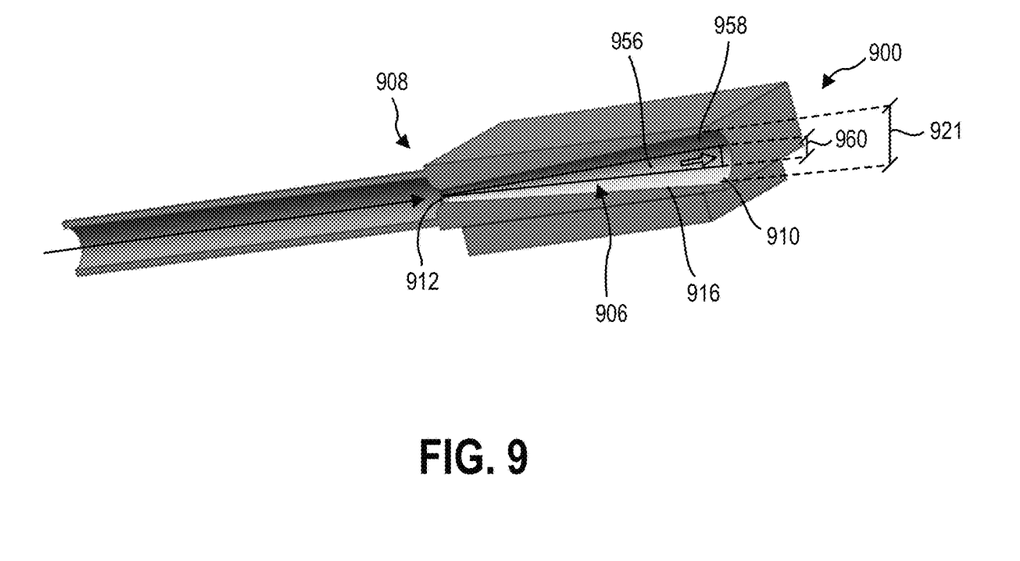
FIG. 9 is a perspective cross-sectional view of a heat sink with a semi-coherent jet therethrough, according to at least some embodiments of the present disclosure.

In some embodiments, atomizing the working fluid includes atomizing a first portion of the working fluid in an annular space around a longitudinal jet. FIG. 9 is a perspective cross-sectional view of a heat sink 900 with an orifice 912 configured to allow a second portion of the working fluid to remain coherent or semi-coherent in a longitudinal jet 956 through the expansion chamber 906 thereof. The heat sink 900 receives a working fluid at an inlet port 908 and exhausts the working fluid at an outlet port 910. In some embodiments, the expansion chamber 906 flares from an orifice 912 toward the outlet port 910. The increasing transverse area of the expansion chamber 906 in the direction of working fluid flow (e.g., from the inlet port 908 to the outlet port 910) contributes to expansion of a vapor phase of the working fluid to cool the heat sink 900. The longitudinal jet 956 has an annular space 958 around the longitudinal jet 956 between the longitudinal jet 956 and an inner surface 916 of the expansion chamber 906.

In some embodiments, the coherent or semi-coherent longitudinal jet 956 allows expansion cooling of the working fluid in the annular space 958 while maintaining high flow rates of working fluid through the expansion chamber 906. In some embodiments, the expansion rate of the working fluid is related to the flow rate of the working fluid through expansion chamber 906. Therefore, some embodiments of a heat sink 900 may experience greater cooling rates with a coherent or semi-coherent longitudinal jet 956 urging working fluid flow through the expansion chamber 906. In some embodiments, the annular space 958 is a low static pressure point in the heat sink 900. Droplets of the working fluid may be pulled off of the longitudinal jet 956 within the expansion chamber 906.

In some embodiments, a jet diameter 960 of the coherent or semi-coherent longitudinal jet 956 is at least 5% of an outlet diameter 921 of the expansion chamber 906 at the outlet port 910. In some embodiments, a jet diameter 960 of the coherent or semi-coherent longitudinal jet 956 is at least 10% of an outlet diameter 921 of the expansion chamber 906 at the outlet port 910. In some embodiments, a jet diameter 960 of the coherent or semi-coherent longitudinal jet 956 is at least 15% of an outlet diameter 921 of the expansion chamber 906 at the outlet port 910.

In some embodiments, a jet diameter 960 of the coherent or semi-coherent longitudinal jet 956 is no more than 50% of an outlet diameter 921 of the expansion chamber 906 at the outlet port 910. In some embodiments, a jet diameter 960 of the coherent or semi-coherent longitudinal jet 956 is no more than 40% of an outlet diameter 921 of the expansion chamber 906 at the outlet port 910. In some embodiments, a jet diameter 960 of the coherent or semi-coherent longitudinal jet 956 is no more than 30% of an outlet diameter 921 of the expansion chamber 906 at the outlet port 910. In at least one embodiment, the jet diameter 960 of the coherent or semi-coherent longitudinal jet 956 is between 5% and 50% of the outlet diameter 921. In at least one embodiment, the jet diameter 960 of the coherent or semi-coherent longitudinal jet 956 is between 15% and 30% of the outlet diameter 921.

INDUSTRIAL APPLICABILITY

In some embodiments, a heat sink according to the present disclosure includes an expansion chamber to adiabatically expand a working fluid. The expansion and/or vaporization of the working fluid transfers heat from the heat sink body to the working fluid, which flows through and out of the heat sink body.

In some embodiments, a body of the heat sink receives heat from a heat source. In some embodiments, the heat source is an electronic component, such as a processor, system memory, hardware storage device, network communication device, power supply, or other electronic component that generates heat during operation.

In some embodiments, the heat sink is coupled directly to the heat source. In some embodiments, the heat sink is thermally connected to the heat source by a thermal interface material (TIM), such as a thermal paste, which provides a continuous contact surface to conduct heat from the heat source to the heat sink. In some embodiments, the heat sink is thermally connected to the heat source by a heat pipe, vapor chamber, or other thermal conduit that transfers heat from the heat source to the heat sink via conduction or convection of a working fluid therethrough.

The heat sink, in some embodiments, has a body that defines an expansion chamber. The heat sink receives a working fluid at an inlet port and exhausts the working fluid at an outlet port. In some embodiments, the expansion chamber flares from an orifice toward the outlet port. The increasing transverse area of the expansion chamber in the direction of working fluid flow (e.g., from the inlet port to the outlet port) contributes to expansion of a vapor phase of the working fluid to cool the heat sink.

In some embodiments, a heat sink has a body that is additively manufactured, cast, forged, milled, machines, welded, brazed, or combinations thereof to define the expansion chamber therein. In some embodiments, the body is additively manufactured in a single contiguous piece of material. In other embodiments, the body is formed in two or more separate pieces, which are later fixed together to form the body. The body may include the inlet port, the outlet port, the orifice along with the expansion chamber.

In some embodiments, the inlet port includes a mechanical connection mechanism, such as threads, to connect the heat sink to a working fluid conduit. In some embodiments, the mechanical connection mechanism includes a twist lock, a press fit, a snap fit, a Swagelok style compression fitting, or other fluid conduit connection mechanisms.

In some embodiments, the expansion chamber includes an orifice that provides fluid communication from the inlet port into the expansion chamber. The orifice restricts fluid flow therethrough to increase pressure proximate the inlet port. The relatively high pressure at the inlet port and lower pressure in the expansion chamber (opposite the orifice) accelerates the working fluid through the orifice. In some embodiments, heat in the body in combination with the expansion of the working fluid entering and moving through the expansion chamber vaporizes the working fluid. In some embodiments, the orifice may be changeable by a threaded connection, a press fit, a friction fit, a snap ring, one or more mechanical fasteners, etc.

After passing through the orifice, the working fluid expands into a passage through the expansion chamber. In some embodiments, the passage increases in a transverse dimension (e.g., diameter) in the flow direction. An inner surface of the expansion chamber may define at least a portion of the expanding passage. The passage between the orifice and outlet port flares in at least one of the vertical transverse direction, horizontal transverse direction, or both.

In some embodiments, at least a portion of the passage flares linearly such that the inner surface is linear in longitudinal cross-section. In some embodiments, at least a portion of the passage flares non-linearly such that the inner surface is curved in longitudinal cross-section. In some embodiments, the passage flares uniformly, such as having a linear flare that is constant relative to a longitudinal axis of the expansion chamber. In some embodiments, at least a portion of the passage of the expansion chamber is axially symmetrical around the longitudinal axis (e.g., is at least partially cylindrical and/or conical).

The inner surface of the passage and/or expansion chamber, in some embodiments, includes surface features to promote vaporization and/or heat transfer from the body to the working fluid. For example, the inner surface may include nucleation sites to lower the input energy needed to vaporize the working fluid.

In some embodiments, the orifice is shaped and/or textured to further promote vaporization and/or expansion of the working fluid in the expansion chamber. For example, the orifice may be shaped to cause the working fluid to diverge as the working fluid passes through the orifice into the expansion chamber. In some examples, the orifice may be shaped to direct the working fluid toward an inner surface of the passage and/or expansion chamber as the working fluid passes through the orifice into the expansion chamber. In some examples, the orifice may be shaped to prevent backflow of the working fluid within the passage and/or expansion chamber.

In some embodiments, the orifice has an orifice diameter, and the outlet port has an outlet diameter. It should be understood that the orifice and outlet port may be circular (and therefore have diameters), in other embodiments, the orifice and/or outlet port have non-circular shapes and the orifice diameter and/or outlet diameter are an orifice transverse dimension and/or an outlet transverse dimension, respectively. While embodiments are described as having a diameter, it should be understood that any reference to diameter may be an analogous transverse dimension of a non-circular orifice and/or outlet port.

The orifice diameter and the outlet diameter form an expansion diameter ratio. For example, the expansion diameter ratio may be in a range having an upper value, a lower value, or upper and lower values including any of 0.05 (such as a 0.5 mm orifice diameter to a 10 mm outlet diameter), 0.1, 0.2, 0.3, 0.4, 0.5, 0.6, 0.7, 0.8, or any values therebetween. In some examples, the expansion diameter ratio is at least 0.05. In some examples, the expansion diameter ratio is less than 0.8. In some examples, the expansion diameter ratio is between 0.05 and 0.8. In some examples, the expansion diameter ratio is between 0.1 and 0.5.

The orifice has an orifice area and the outlet port has an outlet area. The orifice area and the outlet area form an expansion area ratio. For example, the expansion area ratio may be in a range having an upper value, a lower value, or upper and lower values including any of 0.01 (such as a 0.1 $mm^2$ orifice area to a 10 $mm^2$ outlet area), 0.05, 0.1, 0.2, 0.3, 0.4, 0.5, 0.6, 0.7, 0.8, or any values therebetween. In some examples, the expansion area ratio is at least 0.01. In some examples, the expansion area ratio is less than 0.8. In some examples, the expansion area ratio is between 0.01 and 0.8. In some examples, the expansion diameter ratio is between 0.05 and 0.25.

In some embodiments, the working fluid enters the inlet port of the heat sink within 5° C. of a boiling point of the working fluid at atmospheric pressure. For example, a working fluid with a boiling point of 50° C. enters the inlet port of the heat sink at no less than 45° C. In some embodiments, the working fluid enters the inlet port of the heat sink at the boiling point of the working fluid at atmospheric pressure. In some embodiments, a working fluid with a boiling point of 50° C. enters the inlet port of the heat sink at a temperature of 50° C.

The body may be manufactured according to the methods and/or geometries described herein, and a thermal slug transfers heat from the heat source to the heat sink. In some embodiments, the thermal slug is coupled to the body of the heat sink after the heat sink is manufactured. In some embodiments, at least a portion of the expansion chamber and/or passage is machined into the thermal slug.

In some embodiments, a heat sink includes at least one heat transfer feature positioned in the expansion chamber. For example, a plurality of fins are positioned proximate the outlet port of the heat sink. The fins are coupled to and/or integrally formed with the body of the heat sink to transfer heat to a working fluid passing through the expansion chamber and out of the outlet port. The working fluid passes through the orifice into the expansion chamber and, after expanding into a gas, the gas will decrease in temperature before receiving heat from the fins in the heat transfer feature portion of the heat sink before exiting through the outlet port. In other embodiments, the thermal transfer features include pins, mesh, posts, surface textures, or combinations thereof.

In some embodiments, the heat transfer features are in a portion of the expansion chamber. In some embodiments, the heat transfer features are in a full longitudinal length of the expansion chamber. In some embodiments, the heat transfer features are in at least 10% of a longitudinal length of the expansion chamber. In some embodiments, the heat transfer features are in at least 25% of a longitudinal length of the expansion chamber 406. In some embodiments, the heat transfer features are in at least 50% of a longitudinal length of the expansion chamber.

In some embodiments, at least a portion of the expansion chamber flares in a first transverse direction, while flaring by a different amount and/or staying uniform in the second transverse direction. In some embodiments of a heat sink, the expansion chamber flares in horizontal direction while remaining a uniform height along a longitudinal length of the expansion chamber. In some embodiments, the expansion chamber has uniform transverse dimensions in a heat transfer feature portion.

Some embodiments of heat sinks include a plurality of expansion chambers in a single body. In other embodiments, the heat sink has a plurality of bodies. In some embodiments, the heat transfer features are located radially around a longitudinal axis of the expansion chamber.

In some embodiments, the expansion chambers receive working fluid from the inlet port through a manifold that distributes working fluid to orifices of the expansion chambers. In some embodiments, the expansion chambers have the same geometry (e.g., same flare, same area, same volume). In some embodiments, the expansion chambers have different geometries. In some embodiments, the expansion chambers have different geometries that are based at least partially on differences in fluid pressure in the manifold at each of the orifices.

In some embodiments, the longitudinal axes of the expansion chambers are parallel to one another. In other embodiments, at least one of the longitudinal axes of the expansion chambers 506 is not parallel to at least one other longitudinal axis.

In some embodiments, the array of expansion chambers is 1×5. In other embodiments, an array of expansion chambers is 1×2, 1×3, 1×4, 1×10, 2×2, 2×4, 2×7, 3×5, or any other arrangement of expansion chambers.

In some embodiments, pressurizing mechanism provides immersion tank working fluid to an inlet port of a heat sink at an increased fluid pressure relative to the outlet port of the heat sink. For example, the pressurizing mechanism receives the immersion working fluid at an inlet of the pressurizing mechanism and urges the immersion working fluid out of an outlet of the pressurizing mechanism at an increased fluid pressure. In some embodiments, the pressurizing mechanism is a fluid pump. In some embodiments, the pressurizing mechanism is a vacuum pump that lowers the fluid pressure proximate the outlet port.

In some embodiments, the working fluid enters the pressurizing mechanism within 10° C. of a boiling point of the working fluid at atmospheric pressure. For example, a working fluid with a boiling point of 50° C. enters the pressurizing mechanism at no less than 40° C.

In some embodiments, a fluid pump pumps the immersion tank working fluid from a fluid reservoir of the liquid phase of the immersion tank working fluid in the immersion tank to a heat sink, such as any embodiment of a heat sink described herein, that is thermally connected to a heat source of a computing device.

In some embodiments, the fluid pump is a diaphragm fluid pump. In some embodiments, the fluid pump is a duplex pump. In some embodiments, the fluid pump is a pneumatic pump. In some embodiments, the fluid pump is a triplex pump. In some embodiments, the fluid pump is a gear pump. In some embodiments, the fluid pump is any fixed displacement pump. In some embodiments, the fluid pump pressurizes the working fluid proximate an orifice in the heat sink to at least 20 pounds per square inch (psi). In some embodiments, the fluid pump pressurizes the working fluid proximate an orifice in the heat sink to at least 70 psi. In some embodiments, the fluid pump pressurizes the working fluid proximate an orifice in the heat sink to at least 90 psi. In some embodiments, the fluid pump pressurizes the working fluid proximate an orifice in the heat sink to at least 100 psi. In some embodiments, the fluid pump pressurizes the working fluid proximate an orifice in the heat sink to at least 200 psi. In some embodiments, the fluid pump pressurizes the working fluid proximate an orifice in the heat sink to at least 300 psi. In some embodiments, the working fluid leaves the outlet port of the heat sink at a pressure at least 5 psi lower than the pressure at which the working fluid entered the inlet of the expansion chamber.

The movement of the immersion tank working fluid through the heat sink vaporizes immersion tank working fluid into a vapor phase of the immersion tank working fluid that is exhausted into the immersion tank. The vapor phase of the immersion tank working fluid may be condensed by a condenser back into the liquid phase of the immersion tank working fluid, which returns to the fluid reservoir.

In some embodiments, the pump is located inside the immersion tank. In some embodiments, the pump is located externally to the immersion tank. For example, an external pump may provide easy access for pump replacement or service. In some embodiments, a pump is connected to a plurality of heat sinks via a distribution manifold inside the tank.

In some embodiments, a heat sink according to the present disclosure is part of a closed-loop thermal management system that does not share the working fluid with other systems. A heat sink may be thermally connected to a heat source of the computing device. A working fluid supply conduit provides a liquid phase of the working fluid to the heat sink (such as any embodiment of a heat sink described herein). In contrast to other embodiments described herein, the working fluid circulated through the heat sink is not shared with the immersion tank. In other words, the working fluid in the heat sink is separated from the immersion tank working fluid in the fluid reservoir.

The heat sink vaporizes the liquid phase of the working fluid provided by the working fluid supply conduit in a vapor phase of the working fluid. In some embodiments, the vapor phase is conveyed by a working fluid return conduit to a heat exchanger that condenses the working fluid from the heat sink. In some embodiments, the condenser of the immersion tank and the heat exchanger are separate and independent of one another. In some embodiments, the condenser of the immersion tank and the heat exchanger are the same but have separate conduits to keep the working fluid from the heat sink separate from the immersion tank working fluid.

In some embodiments, the heat exchanger cools the vapor working fluid without condensing the working fluid into a liquid phase. The working fluid supply line may provide a vapor phase to the heat sink. In some embodiments, a heat sink according to the present disclosure receives a pressurized vapor phase that subsequently expands while passing through the orifice and/or expansion chamber, as described herein. In some embodiments, adiabatic expansion of the vapor working fluid cools the working fluid to receive heat from the heat sink and cool the heat sink.

In some embodiments, the heat exchanger includes a fluid pump to pressurize the working fluid in the working fluid supply conduit. In some embodiments, the fluid pump is a diaphragm fluid pump. In some embodiments, the fluid pump is a duplex pump. In some embodiments, the fluid pump is a pneumatic pump. In some embodiments, the fluid pump pressurizes the working fluid proximate an orifice in the heat sink to at least 70 pounds per square inch. In some embodiments, the fluid pump pressurizes the working fluid proximate an orifice in the heat sink to at least 90 pounds per square inch. In some embodiments, it may be critical that the fluid pump pressurizes the working fluid proximate an orifice in the heat sink to at least 100 pounds per square inch.

In some embodiments, a method of thermal management includes connecting a heat sink, such as any heat sink described herein, to one or more heat sources. The heat source may be any component(s) of an electronic device that generates heat during operation. In some embodiments, the method includes providing a working fluid through an inlet port in the heat sink at a pressure above 20 psi, and then reducing the pressure of the working fluid after the inlet port and prior to an outlet port of the heat sink to reduce the temperature of the working fluid within the heat sink.

In some embodiments, the heat source operates at a maximum temperature of at least 50° C. In some embodiments, reducing the temperature of the working fluid includes changing a physical phase of the working fluid after passing through the inlet port and before passing through the outlet port. In some embodiments, reducing the temperature of the working fluid includes atomizing the working fluid after passing through the inlet port and before passing through the outlet port. In some embodiments, atomizing the working fluid includes passing the working fluid through an orifice in the heat sink.

In some embodiments, atomizing the working fluid includes atomizing a first portion of the working fluid in an annular space around a longitudinal jet. The heat sink receives a working fluid at an inlet port and exhausts the working fluid at an outlet port. In some embodiments, the expansion chamber flares from an orifice toward the outlet port. The increasing transverse area of the expansion chamber in the direction of working fluid flow (e.g., from the inlet port to the outlet port) contributes to expansion of a vapor phase of the working fluid to cool the heat sink. In some embodiments, a longitudinal jet through the expansion chamber has an annular space around the longitudinal jet between the longitudinal jet and an inner surface of the expansion chamber.

In some embodiments, the coherent or semi-coherent longitudinal jet allows expansion cooling of the working fluid in the annular space while maintaining high flow rates of working fluid through the expansion chamber. In some embodiments, the expansion rate of the working fluid is related to the flow rate of the working fluid through expansion chamber. Therefore, some embodiments of a heat sink may experience greater cooling rates with a coherent or semi-coherent longitudinal jet urging working fluid flow through the expansion chamber. In some embodiments, the annular space is a low static pressure point in the heat sink. Droplets of the working fluid may be pulled off of the longitudinal jet within the expansion chamber.

In some embodiments, a jet diameter of the coherent or semi-coherent longitudinal jet is at least 5% of an outlet diameter of the expansion chamber at the outlet port. In some embodiments, a jet diameter of the coherent or semi-coherent longitudinal jet is at least 10% of an outlet diameter of the expansion chamber at the outlet port. In some embodiments, a jet diameter of the coherent or semi-coherent longitudinal jet is at least 15% of an outlet diameter of the expansion chamber at the outlet port.

In some embodiments, a jet diameter of the coherent or semi-coherent longitudinal jet is no more than 50% of an outlet diameter of the expansion chamber at the outlet port. In some embodiments, a jet diameter of the coherent or semi-coherent longitudinal jet is no more than 40% of an outlet diameter of the expansion chamber at the outlet port. In some embodiments, a jet diameter of the coherent or semi-coherent longitudinal jet is no more than 30% of an outlet diameter of the expansion chamber at the outlet port. In at least one embodiment, the jet diameter of the coherent or semi-coherent longitudinal jet is between 5% and 50% of the outlet diameter. In at least one embodiment, the jet diameter of the coherent or semi-coherent longitudinal jet is between 15% and 30% of the outlet diameter.

In some embodiments, the present disclosure relates to systems and methods of thermal management according to any of the examples described in the sections below:

[A1] In some embodiments, a heat sink includes a body configured to receive heat from a heat source and an expansion chamber inside the body, where the expansion chamber is configured to expand a working fluid from an inlet port of the heat sink.

[A2] In some embodiments, the body of [A1] includes the inlet port and the output port.

[A3] In some embodiments, the expansion chamber of [A1] or [A2] includes an orifice.

[A4] In some embodiments, the orifice of [A3] has an area smaller than an area of the outlet port.

[A5] In some embodiments, a ratio of an orifice diameter of the orifice of [A3] and an outlet diameter of the output port is 1:5.

[A6] In some embodiments, an orifice diameter of the orifice of [A3] or [A4] is about 0.5 mm.

[A7] In some embodiments, the outlet port of any of [A1] through [A6] send the working fluid to an immersion tank.

[A8] In some embodiments, the outlet port of any of [A1] through [A7] send the working fluid to an immersion tank.

[A9] In some embodiments, the body of any of [A1] through [A8] includes a passage between an orifice and an outlet port.

[A10] In some embodiments, at least a portion of the passage of any of [A1] through [A9] is axially symmetric.

[A11] In some embodiments, at least a portion of the passage of any of [A1] through [A10] includes one or more heat transfer features configured to depressurize vapor working fluid.

[A12] In some embodiments, the one or more heat transfer features of [A11] include one or more fins within at least a portion of the passage configured to depressurize vapor working fluid.

[A13] In some embodiments, the one or more heat transfer features of [A11] or [A12] include one or more pins within at least a portion of the passage configured to depressurize vapor working fluid.

[A14] In some embodiments, the one or more heat transfer features of [A11] through [A13] include one or more meshes within at least a portion of the passage configured to depressurize vapor working fluid.

[A15] In some embodiments, at least a portion of the passage of any of [A9] through [A14] flares between the orifice and the outlet port.

[A16] In some embodiments, at least a portion of the passage of [A15] flares uniformly from the orifice to the outlet port.

[A17] In some embodiments, at least a portion of the passage of [A15] flares linearly from the orifice to the outlet port.

[A18] In some embodiments, at least a portion of the passage of [A15] flares non-linearly from the orifice to the outlet port.

[A19] In some embodiments, at least a portion of the passage of [A15] flares at an angle from a longitudinal axis of the passage from the orifice to the outlet port.

[A20] In some embodiments, the orifice of any of [A9] through [A19] is shaped to cause the working fluid to diverge.

[A21] In some embodiments, the orifice of any of [A9] through [A20] is shaped to prevent backflow within the passage.

[A22] In some embodiments, the orifice of any of [A9] through [A21] is shaped to direct the working fluid toward an inner surface of the passage.

[A23] In some embodiments, at least a portion of the passage of any of [A9] through [A22] includes a boiling enhancement coating.

[A24] In some embodiments, at least a portion of the passage of any of [A9] through [A22] includes surface features to facilitate nucleation of the working fluid.

[A25] In some embodiments, the heat sink of any of [A1] through [A24] includes insulation on an outer surface of the heat sink.

[A26] In some embodiments, the heat sink of any of [A1] through [A25] includes additional expansion chambers.

[A27] In some embodiments, the expansion chambers of [A26] are oriented in an array.

[A28] In some embodiments, the heat sink of [A27] includes a manifold to distribute working fluid from the inlet port to the expansion chambers.

[B1] In some embodiments, an immersion cooling system includes a heat sink of any of [A1] through [A28] and a pressurizing mechanism for pressurizing working fluid prior to the inlet port.

[B2] In some embodiments, the pressurizing mechanism of [B1] includes an inlet port and an outlet port, and the inlet port of the pressurizing mechanism is configured to receive the working fluid from a source and the outlet port of the pressurizing mechanism is in fluid communication with the inlet port of the heat sink.

[B3] In some embodiments, the pressurizing mechanism of [B1] or [B2] is a pump.

[B4] In some embodiments, the pressurizing mechanism of [B3] is a duplex pump.

[B5] In some embodiments, the duplex pump of [B4] is a pneumatic pump.

[B6] In some embodiments, the pump of any of [B3] through [B5] is configured to pressurize the working fluid to at least 100 pounds per square inch (psi).

[B7] In some embodiments, the immersion system of any of [B1] through [B6] includes an immersion tank at least partially filled with an immersion tank working fluid, and the immersion tank working fluid and the working fluid in the heat sink are different fluids.

[B8] In some embodiments, a heat exchanger is in fluid communication with the pump of any of [B3] through [B7].

[B9] In some embodiments, the immersion system of any of [B1] through [B6] includes an immersion tank at least partially filled with the working fluid, and the working fluid in the tank and the working fluid in the heat sink are the same fluid.

[B10] In some embodiments, the immersion system of any of [B1] through [B9] includes at least one heat source, and the heat sink is thermally connected to the at least one heat source.

[B11] In some embodiments, the immersion system of any of [B1] through [B9] includes at least one heat source and a plurality of heat sinks of any of [A1] through [A28], and the plurality of the heat sinks is thermally connected to the at least one of the plurality of heat sources.

[B12] In some embodiments, the working fluid enters the pressurizing mechanism of any of [B1] through [B11] at a temperature within 10° C. of a boiling temperature of the working fluid at atmospheric pressure.

[B13] In some embodiments, the working fluid enters the pressurizing mechanism of any of [B1] through [B11] at a temperature within 5° C. of a boiling temperature of the working fluid at atmospheric pressure.

[B14] In some embodiments, the working fluid enters the pressurizing mechanism of any of [B1] through [B11] at a boiling temperature of the working fluid at atmospheric pressure.

[B15] In some embodiments, the working fluid enters the pressurizing mechanism of any of [B1] through [B14] at a temperature of 50° C.

[B16] In some embodiments, the working fluid enters the inlet port of the heat sink of any of [B1] through [B15] at a pressure of at least 20 psi.

[B17] In some embodiments, the working fluid enters the inlet port of the heat sink of any of [B1] through [B15] at a pressure of at least 70 psi.

[B18] In some embodiments, the working fluid enters the inlet port of the heat sink of any of [B1] through [B15] at a pressure of at least 70 psi.

[B19] In some embodiments, the working fluid leaves the outlet port of the heat sink at a pressure at least 5 psi lower than the pressure at which the working fluid entered the inlet of the expansion chamber.

[C1] In some embodiments, a method comprises connecting a heat sink of any of [A1] through [A28] to a heat source, providing a working fluid through an inlet port in the heat sink at a pressure above 20 pound per square inch; and reducing the pressure of the working fluid after the inlet port and prior to an outlet port of the heat sink to reduce the temperature of the working fluid within the heat sink.

[C2] In some embodiments, the heat source of [C1] operates at a maximum temperature of at least 50° C.

[C3] In some embodiments, the working fluid of [C1] or [C2] changes phase after passing through the inlet port and before passing through the outlet port.

[C4] In some embodiments, the working fluid of [C1] or [C2] atomizes after passing through the inlet.

[C5] In some embodiments, the working fluid of any of [C1] through [C4] expands in volume after passing through the inlet.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A heat sink comprising:
   a body configured to receive heat from a heat source, the body including an inlet port and an outlet port; and
   an expansion chamber inside the body, the expansion chamber configured to expand a working fluid from the inlet port to the outlet port of the heat sink, the expansion chamber further includes an orifice, wherein the orifice has an orifice area and the outlet port has an outlet area, an expansion area ratio defined as the orifice area divided by the outlet area, wherein the expansion area ratio defines a linear flare that is constant relative to a longitudinal axis of the expansion chamber from the orifice to the outlet port to prevent backflow of the working fluid within the expansion chamber, wherein the expansion area ratio is between 0.01 and 0.8.

2. The heat sink of claim 1, wherein the expansion area ratio is between 0.05 and 0.25.

3. The heat sink of claim 1, wherein the orifice area has an orifice diameter and the outlet area has an outlet diameter.

4. The heat sink of claim 1, wherein the body includes a passage between the expansion chamber and the outlet port.

5. The heat sink of claim 4, wherein at least a portion of the passage is axially symmetric.

6. The heat sink of claim 4, wherein at least a portion of the passage includes one or more heat transfer features.

7. The heat sink of claim 6, wherein the one or more heat transfer features include one or more fins within at least the portion of the passage.

8. The heat sink of claim 6, wherein the heat transfer features are located radially around a longitudinal axis of the passage.

9. The heat sink of claim 1, wherein the expansion chamber between the orifice and the outlet port flares uniformly from the orifice to the outlet port.

10. The heat sink of claim 1, further comprising a plurality of expansion chambers in fluid communication with the inlet port, wherein the expansion chamber is a first expansion chamber of the plurality of expansion chambers.

11. The heat sink of claim 10, wherein the plurality of expansion chambers are oriented in an array.

12. The heat sink of claim 10, further comprising a manifold to distribute the working fluid from the inlet port to the plurality of expansion chamber.

13. An immersion system comprising:
    a heat sink including:
       a body configured to receive heat from a heat source;
       an expansion chamber inside the body, the expansion chamber including an atomizing orifice configured to atomize a first portion of a working fluid as the working fluid exits the orifice into the expansion chamber, the expansion chamber configured to expand the working fluid from an inlet port to an outlet port of the heat sink, wherein the expansion chamber constantly flares from an inlet port to an outlet port at an expansion ratio, wherein the expansion chamber has an expansion area ratio defined as a diameter of the inlet port divided by an area of the outlet port, wherein the expansion area ratio is between 0.01 and 0.8;
       the inlet port in fluid communication with the orifice of the expansion chamber; and the outlet port in fluid communication with the expansion chamber for exhausting the working fluid from the heat sink; and a pump for pressurizing the working fluid prior to the inlet port configured to pressurize the working fluid to at least 100 pounds per square inch (PSI).

14. The immersion system of claim 13, further comprising an immersion tank at least partially filled with an immersion tank working fluid, wherein the working fluid in the heat sink is not shared with the immersion tank.

15. The immersion system of claim 13, further comprising an immersion tank at least partially filled with the working fluid, wherein the working fluid in the immersion tank and the working fluid in the heat sink are a same working fluid.

16. The heat sink of claim 13, wherein the orifice is configured to form a longitudinal jet of a second portion of the working fluid through the expansion chamber.

17. The heat sink of claim 16, wherein the longitudinal jet is semi-coherent.

* * * * *